(12) United States Patent
Lai et al.

(10) Patent No.: US 9,772,957 B2
(45) Date of Patent: Sep. 26, 2017

(54) PROCESSOR AND METHOD FOR ACCESSING MEMORY

(71) Applicant: Realtek Semiconductor Corp., HsinChu (TW)

(72) Inventors: Chi-Shao Lai, Hsinchu (TW); Ya-Min Chang, Kaohsiung (TW)

(73) Assignee: Realtek Semiconductor Corp., HsinChu (TW)

( * ) Notice: Subject to any disclaimer, the term of this patent is extended or adjusted under 35 U.S.C. 154(b) by 128 days.

(21) Appl. No.: 14/829,656

(22) Filed: Aug. 19, 2015

(65) Prior Publication Data

US 2016/0103619 A1     Apr. 14, 2016

(30) Foreign Application Priority Data

Oct. 13, 2014  (TW) .............................. 103135424 A (51) Int. Cl.
  *G06F 13/16* (2006.01)

(52) U.S. Cl.
  CPC ................. *G06F 13/1626* (2013.01)

(58) Field of Classification Search
  CPC .................................................. G06F 13/1626
  See application file for complete search history.

(56) References Cited

U.S. PATENT DOCUMENTS

| 6,393,512 | B1 | 5/2002 | Chen |
| 6,393,534 | B1* | 5/2002 | Chen ................... G06F 13/1631 |
| | | | 711/158 |
| 6,591,349 | B1* | 7/2003 | Steinman ............ G06F 13/1631 |
| | | | 711/105 |
| 6,622,225 | B1* | 9/2003 | Kessler ............... G06F 13/1642 |
| | | | 711/105 |
| 7,155,582 | B2* | 12/2006 | Ross ................... G06F 13/1631 |
| | | | 710/36 |
| 7,461,216 | B2* | 12/2008 | Sved ................... G06F 13/1642 |
| | | | 711/154 |
| 8,572,322 | B2* | 10/2013 | Xu ...................... G06F 13/1689 |
| | | | 711/122 |
| 9,189,050 | B1* | 11/2015 | Greenberg ............ G06F 1/3203 |
| 2001/0037432 | A1* | 11/2001 | Hotta .................. G06F 12/0846 |
| | | | 711/129 |
| 2002/0002656 | A1* | 1/2002 | Honma ............... G06F 12/0811 |
| | | | 711/122 |
| 2002/0011607 | A1* | 1/2002 | Gelke .................. G11C 16/102 |
| | | | 257/200 |
| 2002/0199057 | A1* | 12/2002 | Schroeder ................. G06F 9/52 |
| | | | 711/108 |

(Continued)

FOREIGN PATENT DOCUMENTS

CN           102402422 A      4/2012

*Primary Examiner* — Midys Rojas
*Assistant Examiner* — Khoa D Doan
(74) *Attorney, Agent, or Firm* — Winston Hsu (57) ABSTRACT

A processor includes a plurality of storage modules and an arbiter, where the storage modules are arranged for storing a plurality of read/write commands, respectively, and the read/write commands are arranged to read/write a memory external to the processor; and the arbiter is coupled to the storage modules, and is arranged to receive the read/write commands from the storage modules, and arrange a sequence of the read/write commands for transmitting to a memory controller.

6 Claims, 7 Drawing Sheets

(56) References Cited

U.S. PATENT DOCUMENTS

| | | | |
|---|---|---|---|
| 2003/0061459 A1* | 3/2003 | Aboulenein | G06F 12/0215 711/167 |
| 2003/0196058 A1* | 10/2003 | Ramagopal | G06F 13/1615 711/169 |
| 2005/0091460 A1* | 4/2005 | Rotithor | G06F 13/1631 711/158 |
| 2005/0132153 A1* | 6/2005 | Yeh | G06F 13/1626 711/158 |
| 2007/0121499 A1* | 5/2007 | Pal | H04L 45/60 370/230 |
| 2007/0136545 A1* | 6/2007 | Kommrusch | G06F 13/1631 711/169 |
| 2008/0082707 A1* | 4/2008 | Gupta | G06F 13/364 710/110 |
| 2009/0138665 A1* | 5/2009 | Suzuki | G06F 13/1694 711/147 |
| 2009/0138682 A1* | 5/2009 | Capps, Jr. | G06F 9/30101 712/220 |
| 2009/0150624 A1* | 6/2009 | Resnick | G06F 9/3004 711/155 |
| 2009/0157980 A1* | 6/2009 | Bruce | G06F 12/0817 711/141 |
| 2010/0077140 A1* | 3/2010 | Abraham | G06F 13/1626 711/106 |
| 2011/0179200 A1* | 7/2011 | Sukonik | G06F 13/1642 710/53 |
| 2011/0302336 A1* | 12/2011 | Naylor | G06F 13/1626 710/35 |
| 2012/0079150 A1* | 3/2012 | Aoki | G06F 13/366 710/110 |
| 2012/0079352 A1* | 3/2012 | Frost | G06F 11/1008 714/767 |
| 2013/0124802 A1* | 5/2013 | Glasco | G06F 12/0804 711/128 |
| 2013/0212330 A1* | 8/2013 | Brittain | G11C 11/40607 711/106 |
| 2013/0332665 A1* | 12/2013 | Sikdar | G11C 7/1072 711/104 |
| 2014/0032968 A1* | 1/2014 | Nandam | G06F 11/2221 714/32 |
| 2014/0101354 A1* | 4/2014 | Liu | G06F 13/1684 710/308 |
| 2014/0317332 A1* | 10/2014 | Yang | G06F 13/1673 710/308 |
| 2015/0154132 A1* | 6/2015 | Tuers | G06F 21/6218 710/111 |

* cited by examiner

| Row address | Bank address | Column address |
|---|---|---|

PROCESSOR AND METHOD FOR ACCESSING MEMORY

BACKGROUND OF THE INVENTION

1. Field of the Invention

The present invention relates to a processor, and more particularly, to a method for a processor to access an external memory.

2. Description of the Prior Art

When a processor is operating, a plurality of internal circuitry modules reads data from or writes data to a Dynamic Random-Access Memory (DRAM). These circuitry modules send a plurality of read/write commands into a DRAM controller to request executing the operation of reading/writing the DRAM.

When the processor sends these read/write commands to the DRAM controller, it does not supply any DRAM-aware protocol scheduling for these read/write commands at the processor-end. Therefore, the burden of the back-end DRAM controller is increased, the efficiency for accessing data is lower, and a response time is longer.

SUMMARY OF THE INVENTION

One of the objectives of the present invention is to provide a processor and a method for accessing memory, which can arrange a sequence of read/write commands transmitted to a memory controller to solve the problems of the prior art.

According to an embodiment of the present invention, a processor comprising a plurality of storage modules and an arbiter is disclosed, wherein the plurality of storage modules are arranged to store and send a plurality of read/write commands at the same time, and the read/write commands are arranged to request reading/writing of a memory external to the processor; and the arbiter coupled to the plurality of storage modules is arranged to receive the plurality of read/write commands of the plurality of storage modules, and arrange a sequence of the read/write commands for transmitting to a memory controller.

According to another embodiment of the present invention, a method for accessing a memory is disclosed, wherein the method comprises: receiving a plurality of read/write commands from a plurality of storage modules, wherein the plurality of read/write commands are arranged to request reading/writing of a memory; and arrange a sequence of the read/write commands for transmitting to a memory controller.

DETAILED DESCRIPTION

In the following description and in the claims, the term "couple" is intended to mean either an indirect or direct electrical connection.

Figure 1:
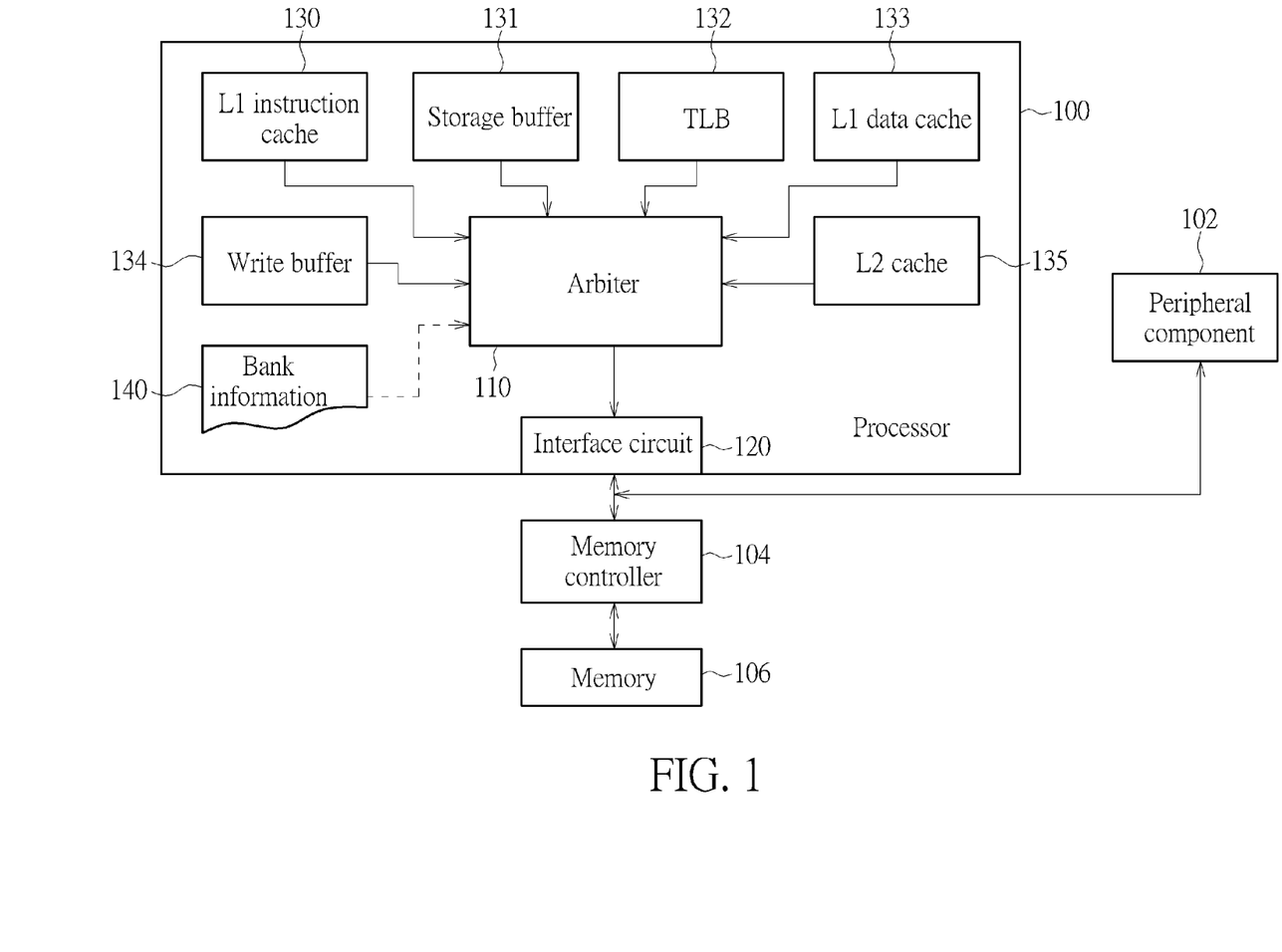
FIG. 1 is a diagram illustrating a processor according to an embodiment of the present invention.

FIG. 1 is a diagram illustrating a processor according to an embodiment of the present invention. As shown in FIG. 1, the processor 100 comprises a plurality of storage modules, an arbiter 110 and a bus interface circuit 120, a Translation Lookaside Buffer (TLB) 132, an L1 data cache 133, a write buffer 134, and an L2 cache 135. In this embodiment, the processor 100 and the peripheral component 102 may access a memory 106 (i.e. read/write the memory 106) via a memory controller 104, so the processor 100 and the peripheral component 102 transmit a plurality of read/write commands to the memory controller 104, and the memory controller 104 reads/writes the memory 106 according to these read/write commands. The peripheral component 102 can directly access any peripheral device of the memory 106 via a Direct Memory Access (DMA) engine, a Peripheral Component Interconnect Express (PCIE) and/or Universal Serial Bus (USB) or other interface. In this embodiment, the processor 100 can be a related processor such as a Central Processing Unit (CPU) or a Graphics Processing Unit (GPU). In should be noted that the processor 100 shown in FIG. 1 only depicts the parts pertinent to the present invention, and one skilled in the art should understand there are other necessary circuits in the processor 100.

In this embodiment, the memory control 104 is a DRAM controller or an SDRAM controller, and the memory 106 is a DRAM or an SDRAM.

In the processor 100 shown in FIG. 1, the storage modules such as the L1 instruction cache 130, the storage buffer 131, the TLB 132, the L1 data cache 133, the write buffer 134 and the L2 cache 135 are arranged for storing read/write commands, wherein the read/write commands are arranged to request reading/ writing operations of the memory 106. The arbiter 110 receives the read/write commands from these storage modules, and arranges a sequence of the read/write commands for transmitting to the memory controller 104. Furthermore, the arbiter 110 arranges the sequence of the read/write commands for transmitting to the memory controller 104 according to bank addresses (the bank information 140 shown in FIG. 1) of the memory read/written by the read/write commands transmitted to the memory controller 104 so that bank conflicts are prevented.

For accessing the DRAM, when two consecutive accessing commands need to access different pages in the same bank, a longer waiting time is required. After achieving the operation of the first accessing command, the memory controller 104 first closes the opening page in the bank so that the page to be accessed issued from the second accessing command can be opened, then transmits the read/write commands to the memory 106 for the access operation. In addition, the above operations concerning opening page, closing page and transmitting read/write commands need a certain waiting time. The waiting time rule can be known by referring to the specifications of SDRAM such as JESD79F, JESD79-2C, and JESD79-3D. As mentioned above, since a longer waiting time is required when two consecutive accessing commands need to access different pages in the same bank, the efficiency of the memory controller 104 is degraded. In this embodiment, the processor 100 is further arranged to have a First In First Out (FIFO) register for storing bank addresses of the memory read/written by the read/write commands transmitted to the memory controller 104. The arbiter 110 preferentially transmits the read/write commands for reading/writing to bank addresses different from those stored in the FIFO register to the memory controller 104. In this way, bank conflict can be prevented and the efficiency of the memory controller 104 can be increased.

Figure 2:
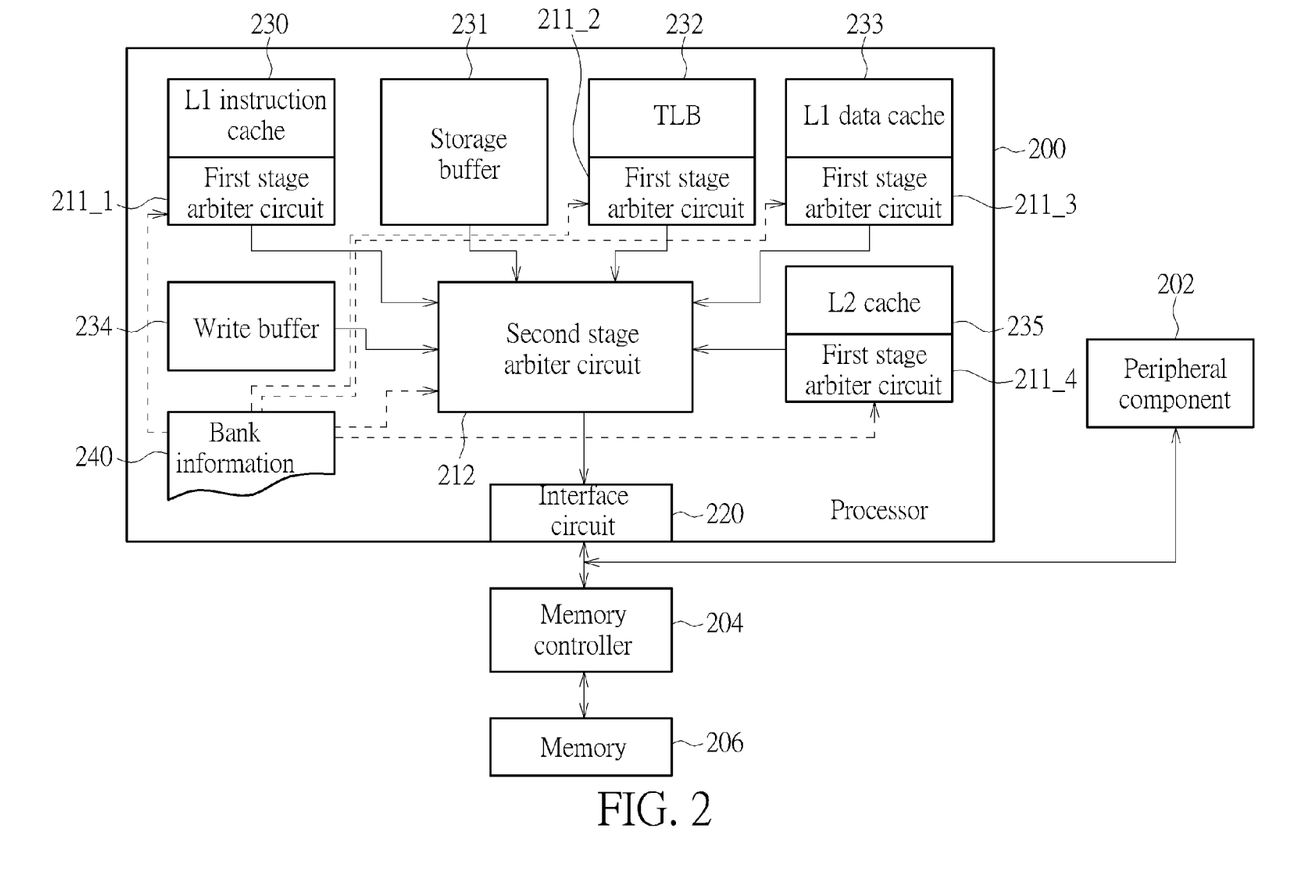
FIG. 2 is a diagram illustrating a processor according to another embodiment of the present invention.

In another embodiment of the present invention, the arbiter 110 can be a multi-stage arbiter, wherein the detailed architecture is illustrated in FIG. 2, which is a diagram illustrating a processor according to another embodiment of the present invention. As shown in FIG. 2, the processor 200 comprises a plurality of storage modules, a plurality of arbiters and interface circuit 220, wherein the storage modules at least comprise an L1 instruction cache 230, a storage buffer 231, a TLB 232, an L1 data cache 233, a write buffer 234, and an L2 cache 235. These components have the same functions as their counterparts in FIG. 1 described above, except that the arbiters in FIG. 2 comprise a plurality of first stage arbiter circuits 211_1, 211_2, 211_3 and 211_4, and a second stage arbiter circuit 212.

In the processor 200 shown in FIG. 2, the first stage arbiter circuit is only disposed in the storage modules needed to store the read commands, i.e. the storage buffer 231 and the write buffer 234 do not have the first stage arbiter circuit inside.

In the processor 200 shown in FIG. 2, the storage modules such as the L1 instruction cache 230, the storage buffer 231, the TLB 232, the L1 data cache 233, the write buffer 234, and the L2 cache 235 are arranged to store the read/write commands, wherein the read/write commands are arranged to request reading/writing of the memory 206. The first stage arbiter circuits 211_1, 211_2, 211_3 and 211_4 receive the read commands from the L1 instruction cache 230, the TLB 232, the L1 data cache 233, and the L2 cache 235, respectively, and arrange a sequence of the read commands for transmitting to the second stage arbiter circuit 212; next, the second stage arbiter circuit 212 receives the plurality of read/write commands from the storage modules or the first stage arbiter circuit, and arranges a sequence of the read/write commands for transmitting to the memory controller 204 so as to prevent bank conflict.

Figure 3:
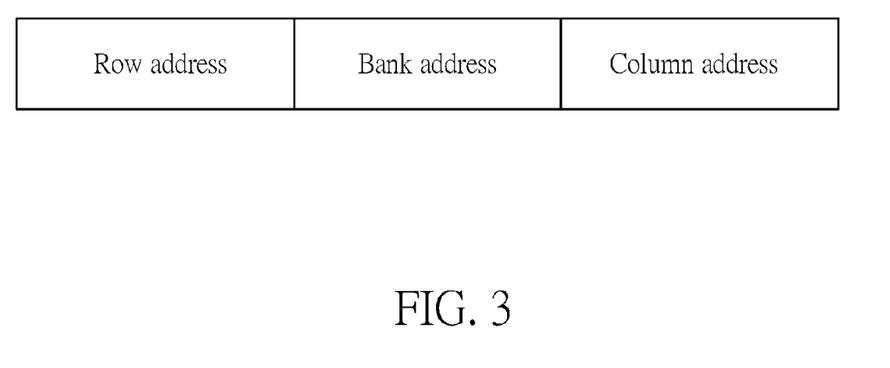
FIG. 3 is a diagram illustrating accessing physical addresses of a memory in the read/write command.

FIG. 3 is a diagram illustrating accessing physical addresses of the memory via the read/write command. As shown in FIG. 3, the physical address comprises row address information (page number), bank address and column address (page offset). The corresponding address field is different accordingly. In addition, the bank addresses of the read commands transmitted to the second stage arbiter circuit 212 from the first stage arbiter circuits 211_1, 211_2, 211_3 and 211_4 and the read/write commands transmitted to the memory controller 204 from the second stage arbiter circuit 212 are extracted as the bank information shown in FIG. 2 to facilitate the first stage arbiter circuits 211_1, 211_2, 211_3 and 211_4 and the second stage arbiter circuit 212 to arrange the transmitting sequences.

Figure 4:
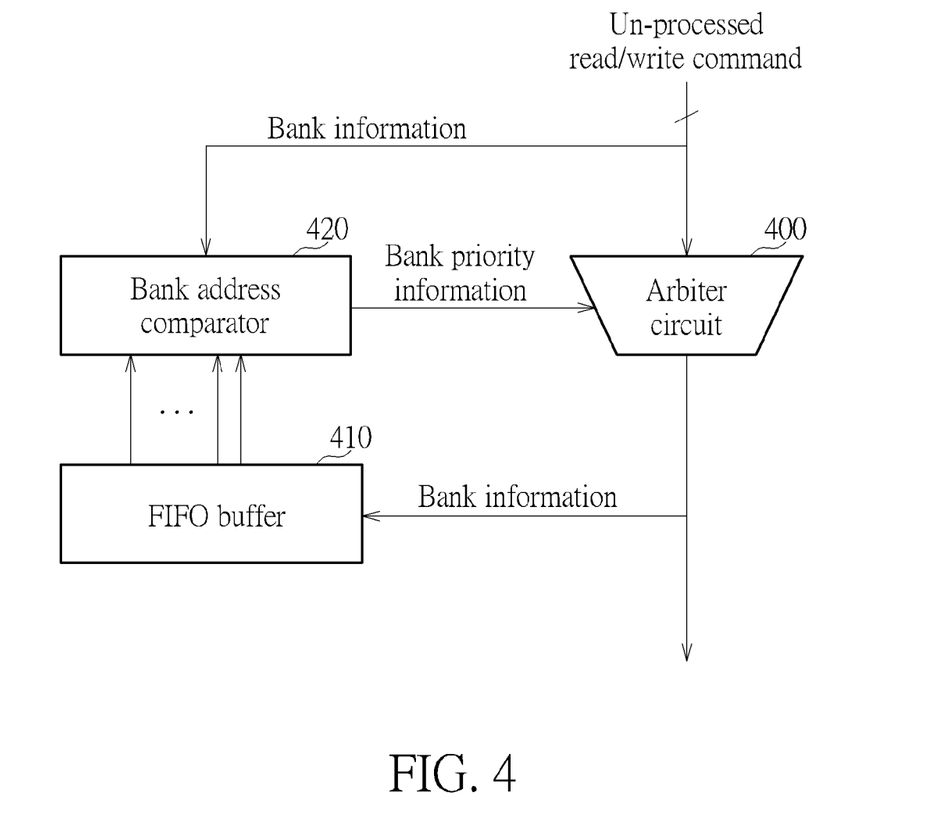
FIG. 4 is a diagram illustrating an arbiter circuit according to an embodiment of the present invention.

FIG. 4 is a diagram illustrating an arbiter circuit 400 according to an embodiment of the present invention, wherein the arbiter circuit 400 can be one of the first stage arbiter circuits 211_1, 211_2, 211_3 and 211_4 and the second stage arbiter circuit 212 shown in FIG. 2. More specifically, assume that the arbiter circuit 400 is the first stage arbiter circuit 211_1, the un-processed read/write commands shown in FIG. 4 are the read commands stored in the L1 instruction cache 130, and the FIFO register 410 stores the bank addresses to be read by the read commands transmitted to the second stage arbiter circuit 212 from the first stage arbiter circuit 211_1. For the operation of the arbiter circuit 400, the bank address comparator 420 first compares the bank address to be read by the un-processed read/write commands with the bank addresses stored in the FIFO register 410 to preferentially select read commands for reading bank addresses different from the bank addresses stored in the FIFO register 410. The arbiter circuit 400 arranges a sequence of the read commands stored in the L1 instruction buffer 230 for transmitting to the second stage arbiter circuit 212 according to the bank priority information provided by the bank address comparator 420, wherein the arbiter circuit 400 reads as different banks as possible. This is meant to prevent consecutively transmitting read commands which read a same bank to the second stage arbiter circuit 212.

Figure 5:
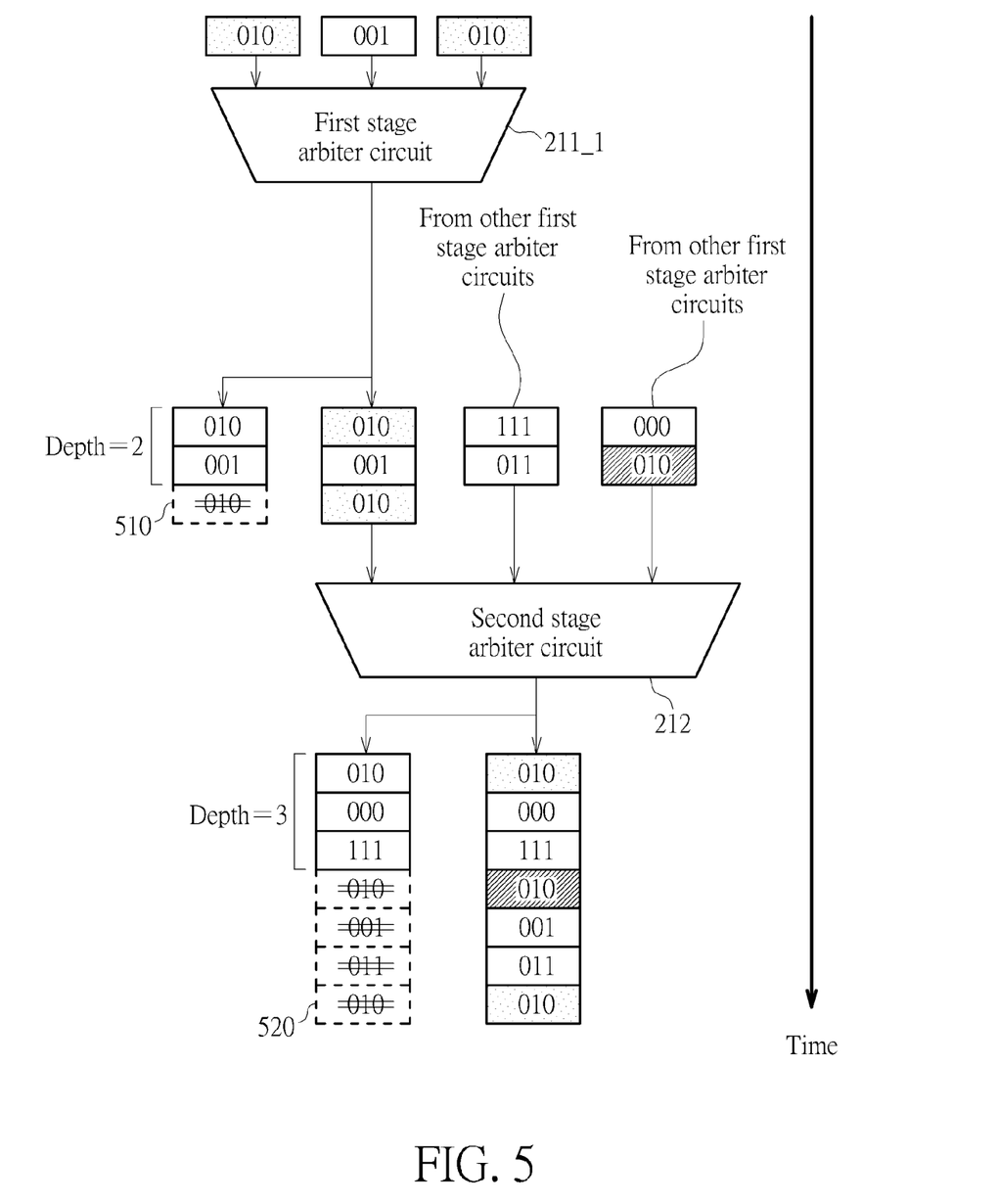
FIG. 5 is a diagram illustrating a first stage arbiter circuit and a second stage arbiter circuit according to an embodiment of the present invention.

FIG. 5 is a diagram illustrating a first stage arbiter circuit and a second stage arbiter circuit according to an embodiment of the present invention, wherein the three bits of information shown in FIG. 5 "010", "001", "000", all represent bank addresses to be read by each read command. The first FIFO register 510 is arranged to store bank addresses in the read commands transmitted to the second stage arbiter circuit 212 from the first stage arbiter circuit 211_1, and the second FIFO register 520 is arranged to store bank addresses in the read commands transmitted to the memory controller 204 from the second stage arbiter circuit 212. In should be noted that a depth of the first FIFO register 510 is 2 and a depth of the second FIFO register is 3 in this embodiment, but this is only for illustrative purposes and not a limitation of the present invention. As shown in FIG. 5, it is assumed that the first stage arbiter circuit 211_1 transmits the read command for reading the bank "010" to the second stage arbiter circuit 212 first. Since the information stored in the bank address "010" has already been stored in the first FIFO register 510, the first stage arbiter circuit 211_1 preferentially transmits the read command for reading the bank "001" to the second stage arbiter circuit 212, then transmits a last read command for reading the bank "010" to the second stage arbiter circuit 212.

With respect to the second stage arbiter circuit 212, since the read command for reading the bank "010" from the first stage arbiter circuit 211_1 is sent to the second stage arbiter circuit 212 first, the second stage arbiter circuit 212 transmits the read command for reading the bank "010" to the memory controller 204 from the first stage arbiter circuit 211_1. At the following time point, three read commands go to the second stage arbiter circuit 212 which are going to read the bank addresses "001", "011", and "010", respectively. Since the second FIFO register 520 stores the bank address "010", the second arbiter circuit 212 transmits the read commands for reading the banks "011", "001" to the memory controller 204, then transmits the read command for reading the bank "010" to the memory controller 204; At the next time point, three read commands which are going to read the bank address "010", "111", "000" go to the second stage arbiter circuit 212 at the same time. Similarly, the second stage arbiter circuit 212 transmits the read commands for reading the banks "111", "000" to the memory controller 204 then transmits the read command for reading the bank "010" to the memory controller 204.

In other embodiments of the present invention, however, when most of the read commands read the same page of the same bank from a cache, the first stage arbiter circuit 211_1, 211_3 and 211_4 may consecutively transmit the read commands for reading the same bank to increase the reading efficiency.

Figure 6:
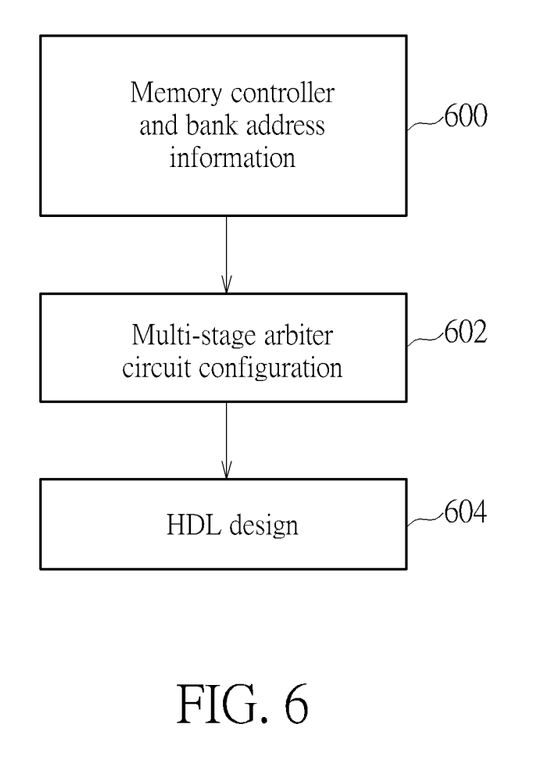
FIG. 6 is a flowchart illustrating a hardware design flow of a processor according to an embodiment of the present invention.

FIG. 6 is a flowchart illustrating a hardware design flow of a processor according to an embodiment of the present invention. As shown in FIG. 6, in step 600, the related information of the memory controller 104/204 and the corresponding bank address are desirable. Next, in step 602, the multi-stage arbiter circuit configurative operation is performed. Finally, the Hardware Description Language (HDL) design is performed in step 604.

Figure 7:
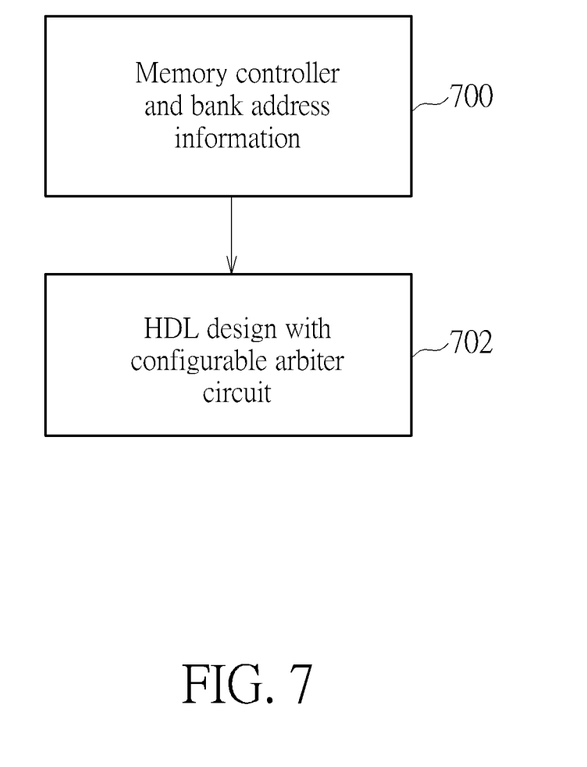
FIG. 7 is a flowchart illustrating a hardware design flow of a processor according to another embodiment of the present invention.

FIG. 7 is a flowchart illustrating a hardware design flow of a processor 100/200 according to another embodiment of the present invention, wherein in step 700, the related information of the memory controller 104/204 and the corresponding bank address are desirable. Next, the HDL design with a configurable arbiter circuit is performed in step 702. In the design flow shown in FIG. 7, the exacted bank address may be adjusted according to the corresponding memory controller 104/204. Therefore, the designed processor 100/200 may correspond to different address mapping of memory controllers 104/204.

Briefly summarized, the processor and the method for accessing memory provided by the present invention can rearrange a sequence of a plurality of read/write commands for transmitting to a memory controller via an arbiter circuit to prevent bank conflict and increase the efficiency of the memory controller when accessing the memory.

What is claimed is:

1. A processor, comprising:
a plurality of storage circuits, arranged to store a plurality of read/write commands, wherein the plurality of read/write commands are arranged to request reading/writing of a memory external to the processor; and
an arbiter circuit, coupled to the plurality of storage circuit, where the arbiter circuit is arranged to receive the plurality of read/write commands from the plurality of storage circuits, and arrange a sequence of the read/write commands for transmitting to a memory controller, wherein the arbiter circuit comprises at least a first stage arbiter circuit and a second stage arbiter circuit, wherein the first stage arbiter circuit is arranged to receive read/write commands of a specific storage circuit of the plurality of storage circuits, and arrange a sequence of the read/write commands of the specific storage circuit to the second stage arbiter circuit; and the second stage arbiter circuit receives the plurality of read/write commands from the plurality of storage circuits, and arranges a sequence of the plurality of read/write commands for transmitting to the memory controller; and
a first First In First Out (FIFO) register, arranged to store bank addresses read/written by read/write commands which have already been transmitted to the second stage arbiter circuit from the specific storage circuit; and
a second FIFO register, arranged to store bank address of the memory read/written by read/write commands which have already been transmitted to the memory controller;
wherein the first stage arbiter circuit transmits read/write commands for reading/writing bank addresses different from the bank addresses stored in the first FIFO register to the second stage arbiter circuit according to the bank addresses stored in the first FIFO register; and the second stage arbiter circuit transmits read/write commands for reading/writing bank addresses different from the bank addresses stored in the second FIFO register according to the bank addresses stored in the second FIFO register.

2. The processor of claim 1, wherein the arbiter circuit arranges the sequence of the read/write commands for transmitting to the memory controller according to read/write commands which have already been transmitted to the memory controller.

3. The processor of claim 2, wherein the arbiter circuit arranges the sequence of the read/write commands for transmitting to the memory controller according to bank addresses of the memory read/written by the read/write commands which have already been transmitted to the memory controller.

4. A method for accessing a memory, comprising:
receiving a plurality of read/write commands from a plurality of storage circuits, wherein the plurality of read/write commands are arranged to request reading/writing of a memory; and
arranging a sequence of the read/write commands for transmitting to a memory controller;
wherein the step of arranging the sequence of the read/write commands for transmitting to the memory controller is performed by an arbiter circuit, and the arbiter circuit comprises at least a first stage arbiter circuit and a second stage arbiter circuit, and the step of arranging the sequence of the read/write commands for transmitting to the memory controller comprises:
using the first stage arbiter circuit for receiving read/write commands of a specific storage circuit of the plurality of storage circuits, and arranging a sequence of the read/write commands of the specific storage circuit for transmitting to the second stage arbiter circuit; and
using the second stage arbiter circuit for receiving the read/write commands from the plurality of storage circuits, and arranging the sequence of the read/write commands for transmitting to the memory controller;
providing a first First In First out (FIFO) register for storing bank address of the memory read/written by read/write commands which have already been transmitted to the second stage arbiter circuit from the specific storage circuit;
providing a second FIFO register for storing bank addresses of the memory read/written by read/write commands which have already been transmitted to the memory controller; and
the step of arranging the sequence of the read/write commands for transmitting to the memory controller comprises:
transmitting read/write commands for reading/writing bank addresses different from the bank addresses stored in the first FIFO register to the second stage arbiter circuit according to the bank addresses stored in the first FIFO register; and
transmitting read/write commands for reading/writing bank addresses different from the bank addresses stored in the second FIFO register to the memory controller according to the bank addresses stored in the second FIFO register.

5. The method of claim 4, wherein the step of arranging the sequence of the read/write commands for transmitting to the memory comprises:
arranging the sequence of the read/write commands for transmitting to the memory controller according to read/write commands which have already been transmitted to the memory controller.

6. The method of claim 4, wherein the step of arranging the sequence of the read/write commands for transmitting to the memory comprises:
arranging the sequence of the read/write commands for transmitting to the memory controller according to bank addresses of the memory read/written by the read/write commands which have already been transmitted to the memory controller.

* * * * *